Patented Oct. 6, 1953

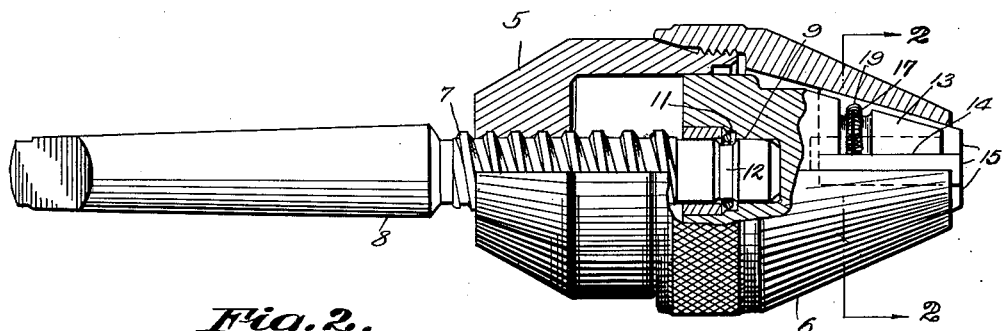
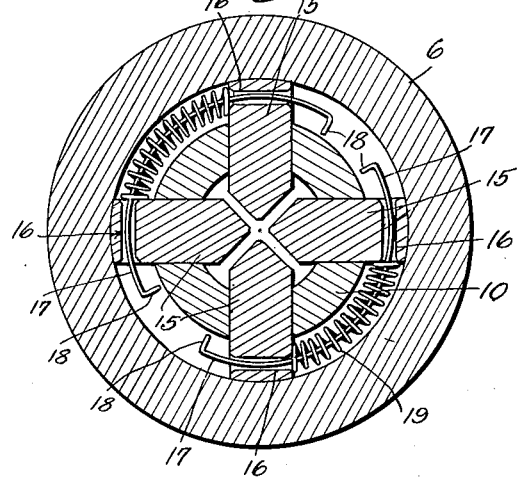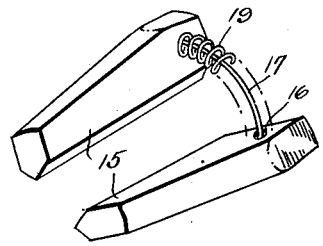
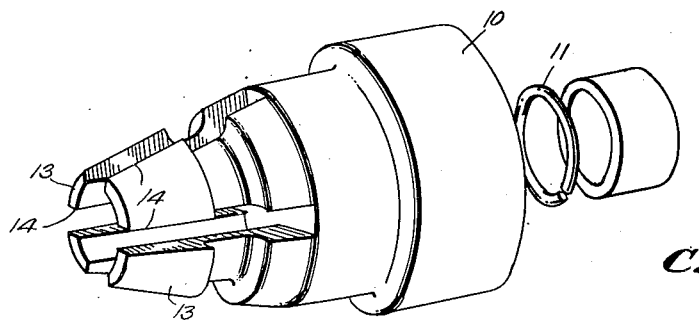

2,654,611

UNITED STATES PATENT OFFICE 2,654,611

ADJUSTABLE SPRING JAW CHUCK

Clifford C. Lee, Aberdeen, S. Dak.

Application March 16, 1950, Serial No. 149,907

1 Claim. (Cl. 279—56)

This invention relates to drill chucks, and more particularly to drill chucks of the spring jaw type, the primary object of the invention being to provide a drill chuck including a housing embodying a cone-shaped jaw guide, against which the inclined outer edges of clutch jaws are forced, whereby the jaws are moved towards each other and tightened on the drill used with the chuck, eliminating the use of the usual wrench employed for tightening jaws of chucks on drill bits.

Another object of the invention is to provide a chuck arbor having swivel connection with the jaw cage of the chuck, the arbor having a threaded portion moving in a threaded opening of the chuck housing, whereby rotation of the arbor advances or retracts the jaws through the cone-shaped outer jaw guide, thereby controlling the operation of the jaws to grip or release a drill mounted in the chuck.

With the foregoing and other objects in view which will appear as the description proceeds, the invention consists of certain novel details of construction and combinations of parts hereinafter more fully described and pointed out in the claim, it being understood that changes may be made in the construction and arrangement of parts without departing from the spirit of the invention as claimed.

Referring to the drawing

Figure 1 is a side elevational view of the chuck, illustrating the chuck housing in section.

Fig. 2 is a sectional view taken on line 2—2 of Fig. 1.

Fig. 3 is a perspective view illustrating one of the spring pressed jaw units of the chuck.

Fig. 4 is a perspective view illustrating the jaw cage section of the chuck.

Referring to the drawing in detail, the chuck comprises the housing which includes the inner section 5 and outer section 6, the section 5 being extended into one end of the section 6, where they are connected by the threads shown in Fig. 1 of the drawing. The section 5 is provided with a threaded opening in its inner end in which the threaded portion 7 of the arbor 8 extends.

The inner end of the arbor 8 extends into the bore 9 of the jaw cage 10 in which bore is arranged the split ring 11, which split ring is adapted to engage within the annular groove 12 formed in the inner end of the arbor 8, securing the arbor to the jaw cage 10 in such a way that the arbor may swivel with respect to the jaw cage.

The jaw cage includes the tapered outer end 13 which is slotted longitudinally from the outer end thereof, providing guides 14 within which the jaws 15 of the chuck are positioned. These jaws 15 are arranged in units of two, and the jaws of each unit are provided with openings 16 in which the ends of the springs 17 are mounted, the springs 17 having their ends bent at right angles at 18 providing stops to prevent the springs from becoming accidentally displaced from the openings 16.

These springs 17 also provide supports for the coiled springs 19 that are arranged between the jaws of each unit, the action of the coiled springs 19 being to urge the jaws outwardly against the tapered inner surface of the cone-shaped section 6 of the chuck.

The jaw cage being movable longitudinally of the outer cone-shaped section 6, will cause the jaws 15 of the chuck, to move inwardly to grip the drill bit positioned within the chuck, securing the drill bit in position.

The movement of the jaw cage 10 is caused by rotating the arbor 8, the threaded portion 7 thereof moving through the threaded opening of the inner section of the housing 5, advancing or retracting the jaw cage as desired.

It is obvious that as the arbor 8 is rotated in an anticlockwise direction, the jaw cage will be moved rearwardly, whereupon the springs will urge the jaws 15 outwardly, releasing their hold on the drill bit which has been positioned therein.

Should it be desired to remove the arbor from the housing of the chuck, it is only necessary to rotate the arbor in an anticlockwise direction, until the inner end of the jaw cage abuts against the inner wall of the inner section 5 of the housing, whereupon further rotary movement of the arbor will cause the arbor to be drawn away from the split ring 11, releasing the arbor from the chuck housing.

It might be further stated that because of the construction of the chuck, the tendency of the chuck body to turn on the threads of the arbor, causes the jaw cage and jaws to be forced outwardly to grip the drill to a greater degree.

From the foregoing it is believed that the construction and operation of the chuck will be obvious, and that further description as to the structure and operation of the chuck is unnecessary.

Having thus described the invention, what is claimed is:

In a drill chuck, a threaded arbor having a reduced end formed with an annular groove, a chuck housing including an inner section having a threaded opening in which the arbor is threaded, an outer cone-shaped housing section threaded on the inner section of the housing, a jaw cage movable within the housing and having a tapered outer surface, said jaw cage having spaced longitudinal slots providing guides and having an annular groove, jaw units having inclined outer surfaces contacting with the inner surface of the outer cone section, mounted within the slots, said jaw units having openings extending transversely therethrough, connecting springs extending through said openings of the jaws, connecting the jaws of each unit, the ends of said springs being extended laterally engaging the jaws of the units, providing stops limiting movement of the jaws with respect to each other, coiled springs mounted on said connecting springs bearing against adjacent jaws normally urging the adjacent jaws away from each other, said coiled springs being disposed in the annular groove of said jaw cage holding said springs against movement longitudinally of the jaw cage, and a split ring fitted in the annular groove of the reduced end of the arbor providing a swivel connection between said arbor and jaw cage.

CLIFFORD C. LEE.

References Cited in the file of this patent

UNITED STATES PATENTS

| Number | Name | Date |
|---|---|---|
| 594,587 | Almond | Nov. 30, 1897 |
| 660,121 | Parsons | Oct. 23, 1900 |
| 986,689 | Clark | Mar. 14, 1911 |
| 1,069,430 | Jensen | Aug. 5, 1913 |
| 1,132,550 | Bodmer | Mar. 23, 1915 |
| 1,369,632 | Diel | Feb. 22, 1921 |
| 1,470,197 | Ryther | Oct. 9, 1923 |
| 1,908,491 | Steiger | May 9, 1933 |

FOREIGN PATENTS

| Number | Country | Date |
|---|---|---|
| 5,974 | Great Britain | Mar. 12, 1909 |